(12) United States Patent
Zhang et al.

(10) Patent No.: US 8,241,539 B2
(45) Date of Patent: Aug. 14, 2012

(54) METHOD OF PATTERNING AND PRODUCT(S) OBTAINED THEREFROM

(75) Inventors: Yong Zhang, Singapore (SG); Meihua Lu, Singapore (SG)

(73) Assignee: National University of Singapore, Singapore (SG)

( * ) Notice: Subject to any disclaimer, the term of this patent is extended or adjusted under 35 U.S.C. 154(b) by 616 days.

(21) Appl. No.: 12/298,504

(22) PCT Filed: Apr. 24, 2007

(86) PCT No.: PCT/SG2007/000116
§ 371 (c)(1),
(2), (4) Date: Oct. 24, 2008

(87) PCT Pub. No.: WO2007/123495
PCT Pub. Date: Nov. 1, 2007

(65) Prior Publication Data
US 2009/0088343 A1    Apr. 2, 2009

Related U.S. Application Data

(60) Provisional application No. 60/795,811, filed on Apr. 25, 2006.

(51) Int. Cl.
*B05D 5/00* (2006.01)
*C40B 99/00* (2006.01)

(52) U.S. Cl. ............ 264/48; 106/122; 427/245; 264/41; 435/4; 435/5; 435/6.1

(58) Field of Classification Search ............... 264/48
See application file for complete search history.

(56) References Cited

U.S. PATENT DOCUMENTS 6,750,050 B2 * 6/2004 Gebhard et al. ............ 435/180

FOREIGN PATENT DOCUMENTS

| EP | 1364702 | 11/2003 |
| EP | 1783162 | 5/2007 |
| WO | WO 99/61148 | 12/1999 |
| WO | WO 00/33078 | 6/2000 |
| WO | WO 2006/112709 | 10/2006 |

OTHER PUBLICATIONS

Matsushita et al., "Hierarchical honeycomb structures utilized a dissipative process", 2004, Synthetic Metals, 147:237-240.*
Lu et al., Adv. Mater., 2006, 18:3094-3098.*
Zhao et al., Journal of Applied Polymer Science, 2003, 90:1846-1850.*
Nishikawa et al., Mat. Sci. Eng. C, 1999, 8-9:495-500.*
Berger et al., "Photonic band gaps and holography," Journal of Applied Physics, 1997, vol. 82(1):60-64.

(Continued)

*Primary Examiner* — Christopher M Gross
*Assistant Examiner* — Jeremy C Flinders
(74) *Attorney, Agent, or Firm* — Clark & Elbing LLP

(57) ABSTRACT

The present invention provides a method of patterning, the method comprising the steps of: (a) providing a porous film; and (b) adding at least one structure to the porous film. The present invention also provides a patterned film prepared according to the method of the invention. The present invention also provides a method of preparing a porous film, and a porous film prepared according to the method of the invention.

15 Claims, 6 Drawing Sheets

OTHER PUBLICATIONS

Böker et al., "Hierarchical nanoparticle assemblies formed by decorating breath figures," Nature Materials, 2004, vol. 3:302-306.

Campbell et al., "Fabrication of photonic crystals for the visible spectrum by holographic lithography," Nature, 2000, vol. 404:53-56.

Cayre O.J. and Paunov V.N., "Fabrication of microlens arrays by gel trapping of self-assembled particle monolayers at the decane-water interface," Journal of Materials Chemistry, 2004, vol. 14:3300-3302.

Wang et al., "Array-based multiplex screening and quantitation of human cytokines and chemokines," Journal of Proteome Research, 2001, vol. 1:337-343.

Cheng et al., "Array rank order regression analysis for the detection of gene copy-number changes in human cancer," Genomics, 2003, vol. 82:122-129.

Karthaus et al., "Water-Assisted Formation of Micrometer-Size Honeycomb Patterns of Polymers," Langmuir, 2000, vol. 16(15):6071-6076.

Khang D-Y and Lee H.H., "Wafer-scale sub-micron lithography," Applied Physics Letters, 1999, vol. 75(17):2599-2601.

Kostic et al., "Advanced patterning techniques for nanodevice fabrication," Journal of Materials Science: Materials in Electronics, 2003, vol. 14:645-648.

Kuhn et al., "A novel, high-performance random array platform for quantitative gene expression profiling," Genome Research, 2004, vol. 14:2347-2356.

Last et al., "Shape deviations in masks for optical structures produced by electron beam lithography," Microsystem Technologies, 2004, vol. 10:527-530.

Lee et al., "Photolithographic Technique for Direct Photochemical Modification and Chemical Micropatterning of Surfaces," Langmuir, 2004, vol. 20(5):1812-1818.

Li et.al., "Ordered Honeycomb-Structured Gold Nanoparticle Films with Changeable Pore Morphology: From Circle to Ellipse", Langmuir, 2005, vol. 21(5):2017-2021.

Martins et al., "Evaluation of Multiplexed Fluorescent Microsphere Immunoassay for Detection of Autoantibodies to Nuclear Antigens", Clinical and Diagnostic Laboratory Immunology, 2004, vol. 11(6):1054-1059.

Mills et al., "DNA microarrays and beyond: completing the journey from tissue to cell," Nature Cell Biology, 2001, vol. 3:E175-E178.

Nishikawa et al., "Mesoscopic patterning of cell adhesive substrates as novel biofunctional interfaces," Materials Science and Engineering C, 1999, vol. 10:141-146.

Noda et al., "Automated Bead Alignment Apparatus Using a Single Bead Capturing Technique for Fabrication of a Miniaturized Bead-Based DNA Probe Array", Analytical Chemistry, 2003, vol. 75(13):3250-3255.

Pavlickova et.al., "Advances in recombinant antibody microarrays," Clinica Chimica Acta, 2004, vol. 343:17-35.

Peng et al., "The influencing factors on the macroporous formation in polymer films by water droplet templating," Polymer, 2004, vol. 45:447-452.

Resnick et al., "Imprint lithography for integrated circuit fabrication," Journal of Vacuum Science and Technology B, 2003, vol. 21(6):2624-2631.

Rogers et al., "Using an elastomeric phase mask for sub-100 nm photolithography in the optical near field," Applied Physical Letters, 1997, vol. 70(20):2658-2660.

Schweitzer B. & Kingsmore S.F., "Measuring proteins on microarrays", Current Opinion in Biotechnology, 2002, vol. 13:14-19.

Sheehan et al., "A simple pen-spotting method for arraying biomolecules on solid substrates", Biosensors & Bioelectronics, 2003, vol. 18:1455-1459.

Shen et al., "High-throughput SNP genotyping on universal bead arrays," Mutation Research, 2005, vol. 573:70-82.

Srinivasarao et al., "Three-Dimensionally Ordered Array of Air Bubbles in a Polymer Film," Science, 2001, vol. 292:79-83.

Steyer et al., "Two-dimensional ordering during droplet growth on a liquid surface," Physical Review B, 1990, vol. 42(1):1086-1089.

Szurdoki et al., "A Duplexed Microsphere-Based Fluorescent Immunoassay," Analytical Biochemistry, 2001, vol. 291:219-228.

Taylor et al., "Flow Cytometric Platform for High-Throughput Single Nucleotide Polymorphism Analysis," BioTechniques, 2001, vol. 30(3):661-669.

Warren et al., "Development of a Protein Chip: A MS-Based Method for Quantitation of Protein Expression and Modification Levels Using an Immunoaffinity Approach," Analytical Chemistry, 2004, vol. 76(14):4082-4092.

Whitesides et al., "Soft Lithography in Biology and Biochemistry," Annual Review of Biomedical Engineering, 2001, vol. 3:335-373.

Widawski et al., "Self-organized honeycomb morphology of star-polymer polystyrene films," Nature, 1994, vol. 369:387-389.

Xiang C.C. and Chen Y., "cDNA microarray technology and its applications," Biotechnology Advances, 2000, vol. 18:35-46.

International Search Report from PCT/SG2007/000116, completed Jun. 8, 2007, mailed Jun. 18, 2007.

International Preliminary Report on Patentability for PCT/SG2007/000116, completed Aug. 12, 2008.

Chittur, S.V., "DNA Microarrays: Tools for the $21^{st}$ Century", Combinatorial Chemistry & High Throughput Screening, 2004, vol. 7(6):531-537.

Devauchelle V. and Chiocchia G., "Quelle place pour les puces à ADN dans les maladies inflammatoires? What place for DNA microarray in inflammatory diseases?" La revue de médecine interne, 2004, vol. 25:732-739, (only abstract in English).

Dharmadi Y. and Gonzalez R., "DNA Microarrays: Experimental Issues, Data Analysis, and Application to Bacterial Systems," Biotechnology Progress, 2004, vol. 20(5):1309-1324.

Ferguson et al., "High-Density Fiber-Optic DNA Random Microsphere Array," Analytical Chemistry, 2000, vol. 72(22):5618-5624.

François et al., "Polymer Films with a Self-Organized Honeycomb Morphology", Advanced Materials, 1995, vol. 7(12):1041-1044.

Heller M.J., "DNA Microarray Technology: Devices, Systems, and Applications", Annual Review of Biomedical Engineering, 2002, vol. 4:129-153.

Hoff et al., "Nanoscale Protein Patterning by Imprint Lithography", Nano Letters, 2004, vol. 4(5):853-857.

Jansen et al., "Preparation of coatings of Molecular Sieve Crystals for Catalysis and Separation," Advanced Zeolite Science and Applications, 1994, vol. 85:215-250.

Jenssen et al., "Analysis of repeatability in spotted cDNA microarrays," Nucleic Acids Research, 2002, vol. 30(14):3235-3244.

Kane et al., "Patterning proteins and cells using soft lithography," Biomaterials, 1999, vol. 20:2363-2376.

Karthaus et al., "Mesoscopic 2-D ordering of inorganic/organic hybrid materials," Materials Science & Engineering C, 1999, vol. 10:103-106.

Karthaus et.al., "Water-Assisted Formation of Micrometer-Size Honeycomb Patterns of Polymers," Langmuir, 2000, vol. 16(15):6071-6076.

\* cited by examiner

METHOD OF PATTERNING AND PRODUCT(S) OBTAINED THEREFROM

CROSS REFERENCE TO RELATED APPLICATIONS

This application is the U.S. National Stage of International Application No. PCT/SG2007/000116, filed Apr. 24, 2007, which claims benefit of U.S. Provisional Application No. 60/795,811, filed Apr. 25, 2006, hereby incorporated by reference.

FIELD OF THE INVENTION

The present invention relates to a method of patterning. In particular, the present invention relates to a method of micropatterning and/or nanopatterning. The present invention also relates to film(s) suitable for micropatterning and/or nanopatterning. The patterned film(s) may be used in microarray and/or nanoarray applications.

BACKGROUND OF THE INVENTION

Micropatterning of biomolecules, i.e., the attachment of biomolecules within designated regions on solid surfaces while preventing non-specific adhesion at other regions, forms the basis of microarray techniques. Microarray techniques have found many applications in various fields such as diagnostics of diseases (V Devauchelle and G Chiocchia, 2004; C C Xiang and Y D Chen, 2000), drug discovery (S V Chittur, 2004), environmental testing (Y Dharmadi and R Gonzalez, 2004), biological studies (M J Heller, 2002; J C Mills et al, 2001; B Schweitzer and S F Kingsmore, 2002), among others. Tremendous effort has been made by many research groups to develop techniques that are compatible for patterning biomolecules on planar surfaces on the micrometer scale. The most widely used micropatterning methods are pin spotting (P E Sheehan et al, 2003), photoresist lithography (K J Lee et al, 2004) and soft lithography (G M Whitesides, 2001; R S Kane et al, 1999).

Currently most microarrays are fabricated on planar substrates which all involve multi-step surface modifications directly on the substrate. The surface modification is usually achieved by dropping a solution onto the surface or immersing the surface into a solution, and many methods often used to homogenise the solution of reactants and to improve the chemical reactions, such as stirring and vortexing, cannot be carried out on the microarray substrate. For this reason, efficiency of chemical reactions is usually low, resulting in low signal-to-noise (S/N) ratio and poor repeatability of results (T K Jenssen et al, 2003; C Cheng et al, 2003; P Pavluckova et al, 2004).

The use of bead-based materials could be a viable alternative as they are ideal reagent-delivery vehicles providing large reactive surface areas, and versatile methods are available for surface modification of the microbeads. They have become omnipresent in biomedical applications such as immunoassays (T B Martins et al, 2004). Capture reagents are immobilized on the surface of various encoded microbeads, and flow cytometry is applied to detect targets captured by the beads in solution (J D Taylor et al, 2001). Recently, several methods have been developed to produce ordered arrays of beads on a substrate with patterned surfaces to form a random array (R Shen et al, 2005; K Kuhn et al, 2004; E N Warren et al, 2004; H Noda et al, 2003). The capture-reagent-immobilised microbeads are also settled down into etched microwells on optical fiber bundles to form a bead microarray, and a fluorescence signal from each bead (spot) is captured and analysed (A F Jane et al, 2000; S Ferenc et al, 2001). The substrate is used as a template to direct the patterning of the beads. The template may have a patterned surface fabricated using a variety of microfabrication techniques such as optical lithography (M Campbell et al, 2000; V Berger et al, 1997; J A Rogers, 1997), electron (e)-beam lithography (A Last et al, 2004; I Kostic et al, 2003) or imprinting (D Y Khang and H H Lee, 1999; D J Resnick et al, 2003; J D Hoff et al, 2004). However, these microfabrication techniques normally require high-end, very expensive equipment such as mask aligners, e-beam writers, and high-quality clean rooms, as well as well-trained people with specific technical knowledge and experience. Therefore, there is a need in the state of the art for an improved method of fabricating substrates with a patterned surface for patterning. In particular, there is a need for a low-cost non-lithographic method to fabricate substrates with patterned surfaces.

Some methods have been developed for synthesis of porous films. For example, a film with arrays of pores based on self-assembly techniques have been used (O J Cayre and V N Paunov, 2004; J C Jansen et al, 1994), which all include the following steps: self-assembly of colloidal microspheres on a solid substrate to form a 2D crystalline structure as a template (e.g., by filtration, centrifugation, and sedimentation), infusion of other materials into the voids of the self-assembled microspheres, solidification of the material, and removal of the template microspheres through either calcination or solvent extraction, thus creating a 2D solid material with ordered pore arrays. However, the problems associated with these methods are that it is difficult to self-assemble template microspheres with long-range order. Further, any defects will result in a disordered structure of the film. Furthermore, the self-assembled microspheres are not stable and can be easily damaged during the process of removing the template.

Another templating method has been developed based on evaporative cooling and subsequent water-droplet templating to form ordered arrays of "breath figures" and used to produce porous films made of various materials (A Boker et al, 2004; B Francois et al, 1995; J Li et al, 2005; J Peng et al, 2004; O Pitois and B Francois, 1999; G Widawski et al, 1994; M Srinivasarao et al, 2001). Some effort has been made to prepare porous polymer films using the breath-figure method. Francois et al., 1995, prepared polymer films with ordered hexagonal arrays of pores using polystyrene-polyparaphenylene block copolymers, star-like homopolystyrenes, and linear polystyrenes with polar terminal groups in carbon disulphide under a flow of moist gas (G Widawski et al, 1994). Srinivasarao et al, 2001, further developed the method and prepared 2D and 3D materials with multilayers of hexagonally packed pores through a templating mechanism based on thermocapillary convention. The formation of ordered hexagonal arrays of water droplets in polymer films was imaged by Shimomura and co-workers (O Karthaus et al, 2000) and different polymers were used including organic-inorganic hybrid materials (O Karthaus et al, 1999), amphiphilic copolymers (T Nishikawa et al, 1999), organometallics and saccharide-containing polymers (N. Maruyama et al, 1998). The porous films are synthesised in a chamber with well-controlled humidity and with a gas flow over the solution surface. The problem with this method is that conditions such as humidity and gas flow must be properly controlled in order to obtain a porous film with ordered arrays of pores.

There is therefore a need in the state of the art to develop a low-cost non-lithographic method to fabricate substrates with patterned surfaces for patterning microbeads, as well as a method for patterning microbeads.

SUMMARY OF THE INVENTION

The present invention seeks to address the problems above, and provides a method of patterning. In particular, the present invention seeks to provide a method of patterning on a porous film for use in some applications such as in microarray and/or nanoarray applications.

According to a first aspect, the present invention provides a method of patterning, the method comprising the steps of:
(a) providing a porous film; and
(b) adding at least one structure to the porous film.

The patterning may be nanopatterning and/or micropatterning.

Any suitable porous film may be used. For example, the porous film may be a polymeric film. The porous film may comprise an ordered array of pores. In particular, the pores may have a substantially uniform pore size.

Any suitable structure for the purposes of the present invention may be used. The structure may be of any suitable size, shape and material. The at least one structure may be a nanostructure and/or a microstructure. The at least one structure may be a biological and/or non-biological structure. In particular, the structure may be a bead, a sphere, a cell, bacteria, or a combination thereof. For example, the structure may be a nanobead, nanosphere, microbead, microsphere, or a combination thereof. Even more in particular, the structure may be polystyrene microbead, silica microbead or a combination thereof.

According to a particular aspect, the average diameter of the structure may be about the same or less than the average diameter of the pores of the porous film. The at least one structure may contact the bore of at least one pore of the porous film. Accordingly, the at least one structure may either partially or completely enter the at least one pore of the porous film. For example, the at least one structure may be completely dispensed into at least one pore, or the at least one structure may be partially dispensed into at least one pore. The at least one structure may rest (sit) on the bottom of at least one pore. In other embodiments, the at least one structure may contact the top surface of the at least one pore or rest on at least one pore of the porous film. For example, the at least one structure may not enter the at least one pore of the porous film at all. The at least one structure may rest (sit) on the top of at least one pore.

At least one agent may be provided on a part of or the whole surface of the structure. Any suitable agent may be used. The agent may be a capture reagent. For example, the agent may be selected from the group consisting of: biological cells, biomolecules, ligands, drug targets and a combination thereof. The biomolecules may comprise proteins, DNA, antibodies and/or antigens. The DNA may comprise full length DNA, cDNA, oligonucleotides, fragments thereof, and the like. The structure may be doped or conjugated with a suitable material, such as a fluorescent material.

The porous film may be prepared according to any suitable method. For example, the porous film may be prepared by any known method. These include methods disclosed in J C Jansen et al, 1994 and O J Cayre and V N Paunov, 2004.

According to a particular aspect, the porous film may be prepared according to the method comprising the steps of:
(i) mixing at least one polymer and at least one hydrophilic material to form a mixture; and
(ii) adding the mixture to at least one surface of a substrate.

The method of preparing the porous film may further comprise the step of cooling the at least one surface of the substrate to form water droplets on the surface. The water droplets which may be formed on the at least one surface when the surface is cooled may depress into the mixture on the substrate to form pores on the surface.

The mixing step of (i) may be carried out in the presence of at least one solvent. Any suitable solvent may be used. In particular, the solvent is an organic solvent. For example, the solvent may be toluene, hexane, chloroform, carbon disulphide, benzene, dichloromethane, tetrahydrofuran or a combination thereof. Even more in particular, the solvent is toluene. Any suitable polymer and hydrophilic material may be used for preparing the porous film. For example, the polymer may be selected from the group consisting of: polystyrene, polyethylene oxide (PEO), poly(methyl methacrylate) (PMMA), poly(caprolactone) (PCL), dodecylacrylamide, carboxyhexylacrylamide, poly(d,l-lactic-co-glycolic acid) (PLGA) and copolymers thereof, and/or the hydrophilic material may be selected from the group consisting of: silicon alkoxides, poly(ethylene oxide), polyethylene glycol and polyacrylamide. The silicon alkoxide may be tetraethyl orthosilicate (TEOS).

The present invention also provides a patterned porous film prepared according to the method of the present invention.

According to another aspect, the present invention provides a patterned film, the patterned film comprising:
(a) a porous film; and
(b) at least one structure.

The patterned film may be a nanopatterned film and/or a micropatterned film. The at least one structure may be a microstructure and/or a nanostructure.

The porous film may be any suitable porous film. The porous film may be as described above. Any suitable structure may be used. The structure may be as described above.

According to a particular aspect, the average diameter of the at least one structure may be about the same or less than the average diameter of the pores of the porous film. The at least one structure may contact the bore of at least one pore of the porous film. Accordingly, the at least one structure may either partially or completely enter the at least one pore of the porous film. For example, the at least one structure may be completely dispensed into at least one pore, or the at least one structure may be partially dispensed into at least one pore. The at least one structure may rest (sit) on the bottom of at least one pore. In other embodiments, the at least one structure may contact the top surface of the at least one pore or rest on at least one pore of the porous film. For example, the at least one structure may not enter the at least one pore of the porous film at all. The at least one structure may rest (sit) on the top of at least one pore.

According to another particular aspect, the porous film may be prepared according to a method comprising the steps of:
(i) mixing at least one polymer and at least one hydrophilic material to form a mixture; and
(ii) adding the mixture to at least one surface of a substrate.

The method of preparing the porous film may further comprise the step of cooling the at least one surface of the substrate to form water droplets on the surface. The water droplets which may be formed on the at least one surface when the surface is cooled may depress into the mixture on the substrate to form pores on the surface.

The mixing step of (i) may be carried out in the presence of at least one solvent. Any suitable solvent may be used. In particular, the solvent is an organic solvent. For example, the solvent may be toluene, hexane, chloroform, carbon disulphide, benzene, dichloromethane, tetrahydrofuran or a combination thereof. Even more in particular, the solvent is toluene. Any suitable polymer and hydrophilic material may be used for preparing the porous film. For example, the polymer may be selected from the group consisting of: polystyrene, polyethylene oxide (PEO), poly(methyl methacrylate) (PMMA), poly(caprolactone) (PCL), dodecylacrylamide, carboxyhexylacrylamide, poly(d,l-lactic-co-glycolic acid) (PLGA) and copolymers thereof, and/or the hydrophilic material may be selected from the group consisting of: silicon alkoxides, poly(ethylene oxide), polyethylene glycol and polyacrylamide. The silicon alkoxide may be tetraethyl orthosilicate (TEOS).

The present invention also provides a method of preparing a porous film, the method comprising the steps of:
(a) mixing at least one polymer and at least one hydrophilic material to form a mixture; and
(b) adding the mixture to at least one surface of a substrate.

The method may further comprise the step of (c) cooling the at least one surface of the substrate to form water droplets on the surface. The water droplets which may be formed on the at least one surface when the surface is cooled may depress into the mixture on the substrate to form pores on the surface The mixing step of (a) may be carried out in the presence of at least one solvent. Any suitable solvent may be used. For example, the solvent may be an organic solvent. For example, the solvent may be toluene, hexane, chloroform, carbon disulphide, benzene, dichloromethane, tetrahydrofuran or a combination thereof. In particular, the solvent may be toluene. Any suitable polymer and hydrophilic material may be used for preparing the porous film. For example, the polymer may be selected from the group consisting of: polystyrene, polyethylene oxide (PEO), poly(methyl methacrylate) (PMMA), poly(caprolactone) (PCL), dodecylacrylamide, carboxyhexylacrylamide, poly(d,l-lactic-co-glycolic acid) (PLGA) and copolymers thereof, and/or the hydrophilic material may be selected from the group consisting of: silicon alkoxides, poly(ethylene oxide), polyethylene glycol and polyacrylamide. The silicon alkoxide may be tetraethyl orthosilicate (TEOS).

According to another aspect, the present invention provides a porous film prepared according to the method of any aspect of the present invention.

Another aspect of the present invention is a kit comprising at least one porous film and/or at least one structure. The porous film may be any suitable porous film. The porous film may be as described above. In particular, the porous film may be a porous film prepared according to any aspect of the present invention. The structure may be as described above. In particular, the structure may be a nanostructure, a microstructure or a combination thereof.

The present invention also provides a kit comprising:
(a) at least one polymer; and
(b) at least one hydrophilic material.

The kit may optionally comprise at least one substrate and/or structure. The kit may further comprise at least one solvent.

Any suitable polymer and hydrophilic material may be used. For example, the polymer and/or hydrophilic material may be as described above. Any suitable structure may be used. For example, the structure may be a nanostructure and/or a microstructure. The structure may be as described above. Any suitable substrate may be used. For example, the substrate may be silicon, ceramic, glass or a polymer. The solvent may be any suitable solvent as described above. In particular, the solvent may be an organic solvent. Even more in particular, the solvent may be toluene.

DETAILED DESCRIPTION OF THE INVENTION

Figure 1:
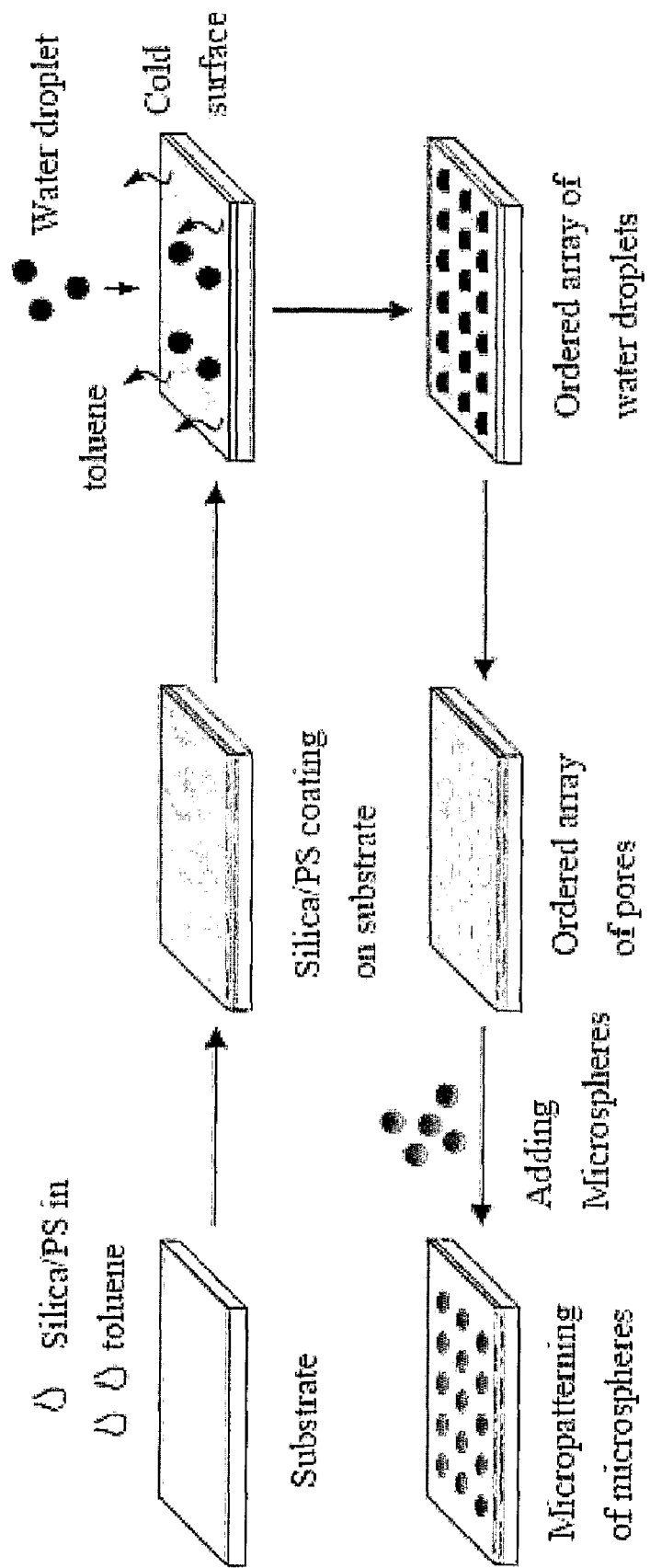
FIG. 1: A schematic diagram showing the formation of polystyrene/silica films with ordered array of pores and subsequent patterning of microspheres using the film.
Figure 2:
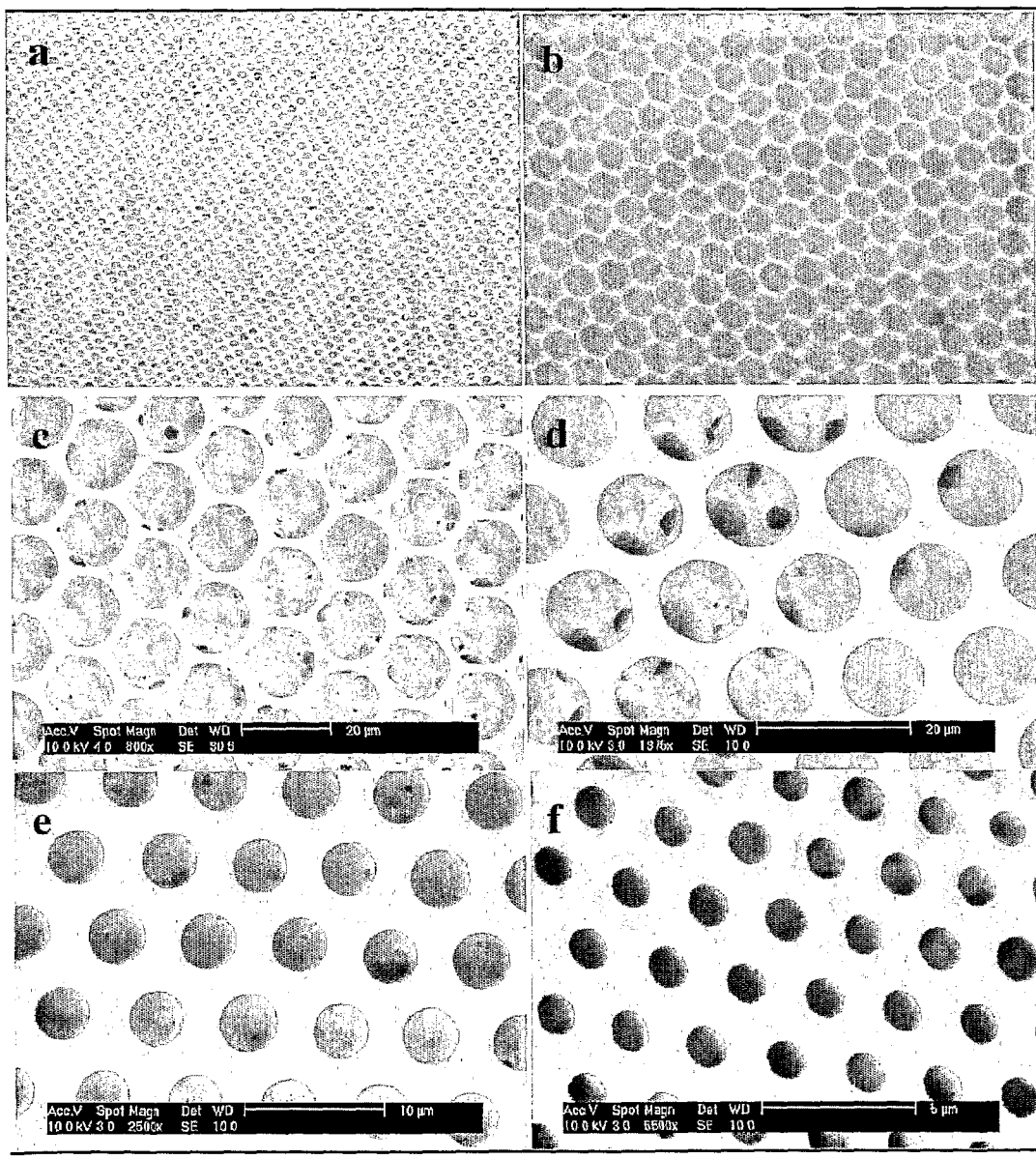
FIG. 2: Optical images of polystyrene/silica films with ordered arrays of pores. (a) low resolution; (b) high resolution; (c) to (f) Scanning electron microscopy (SEM) images of polystyrene/silica films with different pore sizes—(c) 15 μm, (d) 11 μm, (e) 4 μm and (f) 1 μm.

Bibliographic references mentioned in the present specification are for convenience listed in the form of a list of references and added at the end of the examples. The whole content of such bibliographic references is herein incorporated by reference.

The present invention provides a method of patterning. In particular, the present invention provides a non-lithographic method of patterning on porous films. The present invention also provides a method of fabricating bead microarrays on polymer films with ordered array of pores. The method of the present invention has several advantages such as a shorter fabrication time and reduced fabrication cost among others. The method of the present invention may also be used for the fabrication of nanoarrays, in particular, bead-based nanoarrays.

According to a first aspect, the present invention provides a method of patterning, the method comprising the steps of:
(a) providing a porous film; and
(b) adding at least one structure to the porous film.

For the purposes of the present invention, patterning refers to micropatterning and/or nanopatterning, and structure refers to microstructures and/or nanostructures. It would be understood by a person skilled in the art that patterning refers to the attachment of at least one structure within designated regions on a surface while preventing non-specific adhesion at other regions. Such patterning is the basis of microarray and nanoarray techniques.

The porous film may be any suitable porous film. The porous film may comprise at least one layer of porous film. The film may be a polymeric porous film. The porous film may be made of any one of, but not limited to the following: polystyrene, polyethylene oxide (PEO), poly(methyl methacrylate) (PMMA), poly(caprolactone) (PCL), dodecylacrylamide, carboxyhexylacrylamide, poly(d,l-lactic-co-glycolic acid) (PLGA), copolymers thereof, silica or a combination thereof.

The porous film may comprise an ordered array of pores. For the purposes of the present invention, an ordered array of pores is defined as an array of pores having a systematic arrangement. For example, the pore array may be such that there are a pre-determined number of rows and columns of pores, each row and column having a pre-determined number of pores. The pores in each row and/or column may be the same or different. An ordered array of pores may also be taken to comprise pores arranged in a non-random manner. For example, each pore may be spaced equidistant from one another.

The pores of the porous film may have a substantially uniform pore size. For example, at least about 80% of the pores have a uniform pore size. In particular, at least about: 90%, 95%, 98% or 100% of the pores have a uniform pore size. Pore size can be measured by (optical or electron) microscopy. Further, pore size of each pore usually refers to the average pore diameter.

The porous film may be in contact with a substrate. Any suitable substrate may be used for the purposes of the present invention. For example, the substrate may either be organic or inorganic. The substrate may be transparent or translucent. The portion of the surface of the substrate on which the porous film is in contact with may be flat and firm or semi-firm. The substrate may comprise a material selected from a group consisting of silicon, quartz, glass, carbon, alumina, silicon nitride and a combination thereof. Many metals such as gold, platinum, aluminium, copper, titanium, and their alloys are also options for substrates. In addition, many ceramics and polymers may also be used as substrates. Polymers which may be used as substrates include, but are not limited to the following: polystyrene; poly(tetra)fluorethylene; (poly)vinylidenedifluoride; polycarbonate; polymethylmethacrylate; polyvinylethylene; polyethyleneimine; poly(etherether)ketone; polyoxymethylene (POM); polyvinylphenol; polylactides; polymethacrylimide (PMI); polyalkenesulfone (PAS); polyhydroxyethylmethacrylate; polydimethylsiloxane; polyacrylamide; and/or polyimide. The preferred substrates may comprise silicon, glass, ceramic or a polymer. In particular, the polymer may be polystyrene, poly(tetra)fluorethylene, (poly)vinylidenedifluoride; polycarbonate, polymethylmethacrylate, polyvinylethylene, or a combination thereof.

The pores on the film may be formed by any suitable method known in the art. The methods may include, but are not limited to, optical lithography, electron (e)-beam lithography, imprinting, bio-templating, emulsion droplet templating or templating via microphase separation of co-polymer. Other methods include methods based on colloidal crystal templating, which may include the following steps: self-assembly of colloidal structures on a solid substrate to form a 2D crystalline structure as a template by, for example, filtration, centrifugation and/or sedimentation, infusion of other materials into the voids of the self-assembled structures, solidification of the material, and removal of the template structures through either calcinations or solvent extraction, thereby creating a 2D solid material with ordered pore arrays. Other methods include the breath figure method (B Francois et al, 1995; J Peng et al, 2004; G Widawski et al, 1994).

According to a particular aspect, the porous film is prepared according to a method comprising the steps of:
(i) mixing at least one polymer and at least one hydrophilic material to form a mixture; and
(ii) adding the mixture to at least one surface of a substrate.

The method of preparing the porous film may further comprise the step of: (iii) cooling the at least one surface of the substrate to form water droplets on the surface.

Any suitable polymer and hydrophilic material may be used in preparing the porous film. For example, the polymer may be selected from the group consisting of: polystyrene, polyethylene oxide (PEO), poly(methyl methacrylate) (PMMA), poly(caprolactone) (PCL), dodecylacrylamide, carboxyhexylacrylamide, poly(d,l-lactic-co-glycolic acid) (PLGA) and copolymers thereof, and/or the hydrophilic material may be selected from the group consisting of: silicon alkoxides, poly(ethylene oxide), polyethylene glycol and polyacrylamide. The silicon alkoxide may be tetraethyl orthosilicate (TEOS).

The mixing step of (i) may be carried out in the presence of at least one solvent. Any suitable solvent may be used. The at least one solvent may be an organic solvent. In particular, the solvent is a volatile solvent. For example, the solvent may be toluene, hexane, chloroform, carbon disulphide, benzene, dichloromethane, tetrahydrofuran or a mixture thereof. Even more in particular, the solvent is toluene. The water droplets formed on the surface of the substrate may depress into the mixture on the substrate to form pores on the surface. The pores formed may be ordered. In particular, the water droplets depress into the mixture to form an ordered array of pores.

The method of preparing the porous film may be more particularly described as follows. A solution of polystyrene/silica in toluene is dropped onto a clean solid substrate to cover the surface of the substrate. The volatile toluene evaporates very quickly and the surface of the substrate is cooled rapidly. Breath figures form when the cold substrate, with the polystyrene/silica film on the surface, is brought in contact with moist air. The cold surface of the substrate leads to the nucleation and growth of water droplets in the polystyrene/silica films. The water droplets form regular patterns in ambient conditions, for example, in conditions with a relative humidity of about 72%. When the substrate surface is completely covered with water droplets, the temperature difference between the surface and water droplets decreases and eventually dissipates, and the water droplets sink into the solution because they are denser than toluene. Ordered arrays of pores are generated on the film using the water droplets as a template upon the complete evaporation of the solvent and condensed water. A schematic diagram of the formation of an ordered array of pores according to the method described above is shown in FIG. 1. FIG. 1 also shows the step of adding structures to the porous film subsequent to the formation of the porous film, as is described below.

Patterning may be achieved when at least one structure is added onto the porous film. The at least one structure may be the same or different. The at least one structure may be biological and/or non-biological structure. The at least one structure may be a bead, a sphere, a cell, bacteria or a combination thereof. The at least one structure may be a dye and/or quantum dot encoded structure. The bead may be a microbead and/or a nanobead. The sphere may be a microsphere and/or a nanosphere. The at least one structure may be made of any suitable material. For example, the structure may be made of polystyrene, silica, soda lime glass, alumina, titania, polymethylmethacrylate (PMMA), melamine, polylactide or a combination thereof. In particular, the at least one structure is polystyrene microbead and/or silica microbead.

The at least one structure may either enter the pores of the porous film or sit on top of them, depending on its size. Therefore, the size of the pores plays an important role in patterning the structures. According to a particular aspect of the present invention, the average diameter of the at least one structure is about the same or less than the average diameter of the pores of the porous film. The structure may be of any suitable size. For example, the structure may have an average diameter equal to or less than 10 µm. In particular, the average diameter may be from 50 nm to 5 µm. Even more in particular, the average diameter may be from 200 nm to 1 µm. The at least one structure and the at least one pore may make a line contact along the circumference of the pore. The at least one structure may contact the bore of at least one pore of the porous film. The bore of a pore is the inner surface of the pore. Only structures with a size similar to that of the pores may be well patterned. When the size of the structures is bigger than that of the pores, the structures rest (sit on) the pores rather than entering the pores. In this case, it is difficult to obtain a good pattern of structures as the structures sitting on, but not completely inside the pores, may not be stable and may be removed during subsequent processes such as washing. However, when the size of the structures is similar to, or less than that of the pores of the porous film, the structures may enter the pores. The at least one structure may completely or partially enter the at least one pore. The at least one structure may rest (sit on) the bottom of at least one pore. In particular, each structure occupies one pore. Even more in particular, structures with a size similar to that of the pores may be used, as it is possible for much smaller beads to come out of the pores during subsequent processes, such as when the porous film is washed.

The surface of the at least one structure may be provided with at least one agent. For example, the agent may be a capture reagent. The agent may be immobilized on the structures. The agent may include, but is not limited to the following: biological cells, biomolecules, ligands, drug targets, viruses, bacteria, organic molecules and a combination thereof. The biomolecules may comprise proteins, DNA, antibodies, antigens and/or polypeptides or fragments thereof. The DNA may comprise full length DNA, cDNA, oligonucleotides, and/or fragments thereof. Antibodies may comprise at least one of the following: polyclonal antibodies, monoclonal antibodies, single chain antibodies (scFv), F(ab) fragments, $F(ab')_2$ fragments and Fv fragments.

The at least one structure may be doped or conjugated with a fluorescent material. The fluorescent material may be any suitable material. For example, the fluorescent material may be rhodamine, fluorescein isothiocyanate (FITC), Alexa Fluor, PE-Cy5, PE-Texas red, propidium iodide (PI), near-infrared dyes, quantum dot, lanthanide complexes, lanthanide-doped nanocrystals or a combination thereof.

According to another aspect, the present invention provides a patterned porous film prepared according to the method described above. The patterned porous film may be used in several applications such as microarray and/or nanoarray.

The present invention also provides a patterned film, the patterned film comprising:
(a) a porous film; and
(b) at least one structure.

The patterned film may be a micropatterned film and/or a nanopatterned film. The at least one structure may be a microstructure and/or a nanostructure. The porous film and/or the at least one structure may be as described above. The porous film may comprise at least one layer of porous film. The porous film may be an array of porous films. The porous film in each layer and/or array of porous film may be the same or different. The at least one structure may be the same or different.

The porous film may be in contact with a substrate. Any suitable substrate may be used for the purposes of the present invention. For example, the substrate may either be organic or inorganic. The substrate may be transparent or translucent. The portion of the surface of the substrate on which the porous film is in contact with may be flat and firm or semi-firm. The substrate may comprise a material selected from a group consisting of silicon, quartz, glass, carbon, alumina, silicon nitride, and a combination thereof. Many metals such as gold, platinum, aluminium, copper, titanium, and their alloys are also options for substrates. In addition, many ceramics and polymers may also be used as substrates. Polymers which may be used as substrates include, but are not limited to, the following: polystyrene; poly(tetra)fluorethylene; (poly)vinylidenedifluoride; polycarbonate; polymethylmethacrylate; polyvinylethylene; polyethyleneimine; poly(etherether)ketone; polyoxymethylene (POM); polyvinylphenol; polylactides; polymethacrylimide (PMI); polyalkenesulfone (PAS); polyhydroxyethylmethacrylate; polydimethylsiloxane; polyacrylamide; and polyimide. The preferred substrates may comprise silicon, ceramic, glass, or a polymer. In particular, the polymer may be polystyrene, poly(tetra)fluorethylene, (poly)vinylidenedifluoride; polycarbonate, polymethylmethacrylate, polyvinylethylene, or a combination thereof.

The pores of the porous film may be formed by any suitable method known in the art. The methods may include, but are not limited to, optical lithography, electron (e)-beam lithography, imprinting, bio-templating, emulsion droplet templating or templating via microphase separation of co-polymer. Other methods include methods based on colloidal crystal templating, which may include the following steps: self-assembly of colloidal structures on a solid substrate to form a 2D crystalline structure as a template by, for example, filtration, centrifugation and/or sedimentation, infusion of other materials into the voids of the self-assembled structures, solidification of the material, and removal of the template structures through either calcinations or solvent extraction, thereby creating a 2D solid material with ordered pore arrays. Other methods include the breath figure method (B Francois et al, 1995; J Peng et al, 2004; G Widawski et al, 1994).

According to a particular aspect, the porous film is prepared according to a method comprising the steps of:
(i) mixing at least one polymer and at least one hydrophilic material to form a mixture; and
(ii) adding the mixture to at least one surface of a substrate.

The method of preparing the porous film may further comprise the step of: (iii) cooling the at least one surface of the substrate to form water droplets on the surface.

Any suitable polymer and hydrophilic material may be used. For example, the polymer may be selected from the group consisting of: polystyrene, polyethylene oxide (PEO), poly(methyl methacrylate) (PMMA), poly(caprolactone) (PCL), dodecylacrylamide, carboxyhexylacrylamide, poly(d,l-lactic-co-glycolic acid) (PLGA) and copolymers thereof, and/or the hydrophilic material may be selected from the group consisting of: silicon alkoxides, poly(ethylene oxide), polyethylene glycol and polyacrylamide. The silicon alkoxide may be tetraethyl orthosilicate (TEOS).

The mixing step of (i) may be carried out in the presence of at least one solvent. Any suitable solvent may be used. The at least one solvent may be an organic solvent. In particular, the solvent is a volatile solvent. For example, the solvent may be toluene, hexane, chloroform, carbon disulphide, benzene, dichloromethane, tetrahydrofuran or a mixture thereof. Even more in particular, the solvent is toluene. The water droplets formed on the surface of the substrate may depress into the mixture on the substrate to form pores on the surface. The pores formed may be ordered. In particular, the water droplets depress into the mixture to form an ordered array of pores.

The method of preparing the porous film may be more particularly described as follows. A solution of polystyrene/silica in toluene is dropped onto a clean solid substrate to cover the surface of the substrate. The volatile toluene evaporates very quickly and the surface of the substrate is cooled rapidly. Breath figures form when the cold substrate, with the polystyrene/silica film on the surface, is brought in contact with moist air. The cold surface of the substrate leads to the nucleation and growth of water droplets in the polystyrene/silica films. The water droplets form regular patterns in ambient conditions, for example, in conditions having a relative humidity of about 72%. When the substrate surface is completely covered with water droplets, the temperature difference between the surface and water droplets decreases and eventually dissipates, and the water droplets sink into the solution because they are denser than toluene. Ordered arrays of pores are generated on the film using the water droplets as a template upon the complete evaporation of the solvent and condensed water, as shown in FIG. 1. FIG. 1 also shows the step of adding structures to the porous film to form a patterned film, subsequent to the formation of the porous film.

Another aspect of the present invention is a method of preparing a porous film, the method comprising the steps of:
(a) mixing at least one polymer and at least one hydrophilic material to form a mixture; and
(b) adding the mixture to at least one surface of a substrate.

The method of preparing the porous film may further comprise the step of: (c) cooling the at least one surface of the substrate to form water droplets on the surface. The porous film prepared by the method may be used in any other aspect of the present invention.

Any suitable polymer and hydrophilic material may be used. For example, the polymer may be selected from the group consisting of: polystyrene, polyethylene oxide (PEO), poly(methyl methacrylate) (PMMA), poly(caprolactone) (PCL), dodecylacrylamide, carboxyhexylacrylamide, poly (d,l-lactic-co-glycolic acid) (PLGA) and copolymers thereof, and/or the hydrophilic material may be selected from the group consisting of: silicon alkoxides, poly(ethylene oxide), polyethylene glycol and polyacrylamide. The silicon alkoxide may be tetraethyl orthosilicate (TEOS).

The mixing step of (a) may be carried out in the presence of at least one solvent. Any suitable solvent may be used. The at least one solvent may be an organic solvent. In particular, the solvent is a volatile solvent. For example, the solvent may be toluene, hexane, chloroform, carbon disulphide, benzene, dichloromethane, tetrahydrofuran or a mixture thereof. Even more in particular, the solvent is toluene.

Any suitable substrate may be used for the purposes of the present invention. For example, the substrate may either be organic or inorganic. The substrate may be transparent or translucent. The portion of the surface of the substrate on which the porous film is in contact with may be flat and firm or semi-firm. The substrate may comprise a material selected from a group consisting of silicon, quartz, glass, carbon, alumina, silicon nitride, and a combination thereof. Many metals such as gold, platinum, aluminium, copper, titanium, and their alloys are also options for substrates. In addition, many ceramics and polymers may also be used as substrates. Polymers which may be used as substrates include, but are not limited to, the following: polystyrene; poly(tetra)fluorethylene; (poly)vinylidenedifluoride; polycarbonate; polymethylmethacrylate; polyvinylethylene; polyethyleneimine; poly(etherether)ketone; polyoxymethylene (POM); polyvinylphenol; polylactides; polymethacrylimide (PMI); polyalkenesulfone (PAS); polyhydroxyethylmethacrylate; polydimethylsiloxane; polyacrylamide; and polyimide. The preferred substrates may comprise silicon, ceramic, glass, or a polymer. In particular, the polymer may be polystyrene; poly(tetra)fluorethylene; (poly)vinylidenedifluoride; poly-carbonate; polymethylmethacrylate; polyvinylethylene or a combination thereof.

At least a part of one surface of a substrate is contacted with the mixture comprising the at least one polymer and the at least one hydrophilic material. In particular, the mixture comprising the at least one polymer and the at least one hydrophilic material is provided on at least a part of at least one surface of the substrate. The mixture may form a film layer on the substrate. The solvent in the mixture evaporates under ambient conditions. The evaporation of the solvent from the surface of the substrate on which the mixture is provided causes that surface to cool. As a result, breath figures are formed when the cool substrate, with the mixture film on the surface, is brought in contact with moist air. For example, the cool substrate may be brought in contact with ambient air with a suitable relative humidity. The relative humidity may be more than 60%. In particular, the relative humidity may be more than about 65%, 70%, 75%, 78%, 80%, 85%, 90%, 95%, 100%. Even more in particular, the relative humidity may be about 72%.

The breath figures result in the nucleation and growth of water droplets on the film of mixture on the surface of the substrate. The water droplets may form regular patterns in certain conditions as described in A Boker et al, 2004; B Francois et al, 1995; J Li et al, 2005; J Peng et al, 2004; O Pitois and B Francois, 1999; G Widawski et al, 1994; M Srinivasarao et al, 2001. When the substrate surface on which the film of mixture is provided is covered with water droplets, the temperature difference between the surface of the substrate and water droplets decreases and eventually dissipates. The water droplets may then depress into the mixture on the substrate as water is denser than the solvent in which the mixture is mixed. Ordered arrays of pores are formed on the surface of the substrate upon further evaporation of the solvent and the condensed water droplets to form a porous film. The method of the present invention does not require the use of a humidity chamber and external airflow.

The method of preparing the porous film may be more particularly described as follows. A solution of polystyrene/silica in toluene is dropped onto a clean solid substrate to cover the surface of the substrate. The volatile toluene evaporates very quickly and the surface of the substrate is cooled rapidly. Breath figures form when the cold substrate, with the polystyrene/silica film on the surface, is brought in contact with moist air. The cold surface of the substrate leads to the nucleation and growth of water droplets in the polystyrene/silica films. The water droplets form regular patterns in ambient conditions, for example, with a relative humidity of about 72%. When the substrate surface is completely covered with water droplets, the temperature difference between the surface and water droplets decreases and eventually dissipates, and the water droplets sink into the solution because they are denser than toluene. Ordered arrays of pores are generated on the film using the water droplets as a template upon the complete evaporation of the solvent and condensed water. A schematic diagram of the formation of an ordered array of pores according to the method described above is shown in FIG. 1. FIG. 1 also shows the step of adding structures to the porous film, subsequent to the formation of the porous film.

The size of the pores formed on the porous film may be controlled. For example, the size of the pores formed may be controlled by controlling the composition of the mixture comprising at least one polymer and at least one hydrophilic material. In particular, the ratio of the polymer to the hydrophilic material in the mixture may be changed to form pores of different sizes. For example, a smaller polymer to hydrophilic material ratio leads to the formation of smaller pore sizes on the film. This is further exemplified in the example below.

The porous film prepared according to the method of the present invention may be used in patterning of structures on the film. For example, microstructures and/or nanostructures may be patterned on the film. The at least one structure may be a biological and/or a non-biological structure. The structures may be beads, spheres, cells, bacteria, or a combination thereof. The structures may be as described above.

According to another aspect, the present invention provides a porous film prepared according to the method described above. At least one structure may be added onto the porous film. When at least one structure is added onto the prepared porous film, the structures may form the same pattern as that of the pores on the porous film. The structure may be a microstructure and/or a nanostructure. The at least one structure may be a biological and/or non-biological structure. The structure may be a bead, a sphere, a cell, bacteria, or a combination thereof. The structure may be as described above.

The present invention also provides a kit comprising at least one porous film prepared according to the method described above. The kit may further comprise at least one structure. The structure may be a biological and/or a non-biological structure. The structure may be as described above. In particular, the structure may be selected from the group consisting of: beads, spheres, cells, bacteria, and a combination thereof. In particular, the at least one structure may be a polystyrene microbead and/or silica microbead. The at least one structure may have at least one agent provided on the surface of the structure. Optionally, the agent may be provided in separate vials in the kit to be provided on the surface of the structures upon use. The agent may be a capture reagent. The agent may be as described above. The structure may be doped or conjugated with a fluorescent material. Any suitable fluorescent material may be used to dope or conjugate the structure, as described above. In particular, the fluorescent material may be used to dope into or conjugate to the structure. Optionally, the fluorescent material may be provided separately within the kit to be added to the structure upon use. The kit may further comprise a set of instructions on the use of the kit.

The present invention also provides a kit comprising:
(a) at least one polymer; and
(b) at least one hydrophilic material.

The kit may optionally comprise at least one substrate and/or structure. The polymer, hydrophilic material, substrate and/or structure may be as described above. In particular, the polymer may be selected from the group consisting of: polystyrene, polyethylene oxide (PEO), poly(methyl methacrylate) (PMMA), poly(caprolactone) (PCL), dodecylacrylamide, carboxyhexylacrylamide, poly(d,l-lactic-co-glycolic acid) (PLGA) and copolymers thereof. The hydrophilic material may be selected from the group consisting of: silicon alkoxides, poly(ethylene oxide), polyethylene glycol and polyacrylamide. The silicon alkoxide may be tetraethyl orthosilicate (TEOS). In particular, the structure may be polystyrene microbeads, silica microbeads or a combination thereof.

The kit may further comprise at least one solvent. The solvent may be any suitable solvent as described above. The solvent may be a volatile solvent. In particular, the solvent may be an organic solvent. For example, the solvent may be toluene, hexane, chloroform, carbon disulphide, benzene, dichloromethane, tetrahydrofuran or a combination thereof. Even more in particular, the solvent is toluene.

The at least one structure may have at least one agent provided on the surface of the structure. Optionally, the agent may be provided in separate vials in the kit to be provided on the surface of the structures upon use. The agent may be a capture reagent. The agent may be as described above. The structure may be doped or conjugated with a fluorescent material. Any suitable fluorescent material may be used to dope or conjugate the structure, as described above. In particular, the fluorescent material may be used to dope into or conjugate to the structure. Optionally, the fluorescent material may be provided separately within the kit to be added to the structure upon use. The kit may further comprise a set of instructions on the use of the kit.

The porous film, patterned film and/or kits as described above may be used in various applications. For example, the porous film, patterned film and/or kits may be used in microarray and/or nanoarray applications. Such applications are useful in the testing of biomolecules such as DNA and RNA samples, proteins, nucleic acids, and receptor-ligand pairs, as well as in pathogen detection and protein-protein interaction screening. Microarray and/or nanoarray applications are also used for the characterization of genetic state (data from tens of thousands of genes) of a biological specimen such as humans, rats and mice to link gene activity and function to human and/or animal health. Such porous and patterned film may also be used when a larger number of data points for detection are required at a single Having now generally described the invention, the same will be more readily understood through reference to the following examples which are provided by way of illustration, and are not intended to be limiting of the present invention.

EXAMPLES

Chemicals and Materials

Monodispersed Polybead animopolystyrene microbeads (2.6% solid latex, 500 nm to 3 µm in diameter) and Polybead carboxylate-dyed microbeads (red 5.82 µm, blue 6.51 µm, and yellow 5.29 µm) were obtained as aqueous suspensions from Polysciences (Warrington, Pa., USA). TEOS (98%), ammonia solution (33% $NH_3$), and FITC-BSA were purchased from Sigma-Aldrich (Singapore).

Preparation of Polystyrene/Silica Porous Films 0.5 ml of polystyrene bead suspension in water (2.6 wt %) was diluted with 20 ml of 2-propanol and 3.5 ml of deionized water. The pH value was adjusted to 10-11 using ammonia solution. Suitable amounts of $10^{-4}$ mol/L TEOS solution in 2-propanol were added slowly, depending on the size of the pores to be obtained. The beads were then centrifuged down, washed several times using 2-propanol, and the white precipitate was dissolved in toluene. The solution was carefully introduced onto the clean silicon substrate drop wise and the substrate was placed to dry under ambient conditions. The relative humidity was 72%.

Patterning of Polystyrene Microbeads on the Porous Films

A suspension of polystyrene microbeads was dropped onto the prepared porous film, fully covering the top surface of the film. The film was then shaken on a shaker to allow as many beads to go into the pores as possible. After the microbeads were dispensed into the arrayed pores, the surface of the film was washed with water to remove the excess beads. The excess solution was then allowed to evaporate at room temperature.

Immobilisation of FITC-BSA onto Polystyrene Microbeads

Polystyrene microbeads were modified with 3-aminopropyltriethoxysilane (APTES) and then sulfosuccinimidyl 4-[N-maleimidomethyl]cyclohexane-1-carboxylate (Sulfo-SMCC). To conjugate FITC-BSA onto the microbeads, FITC-BSA was dissolved in phosphate buffered saline (PBS) to form a 1 mg/mL solution, and 100 µL of FITC-BSA solution was mixed with 1 mL of the microbead solution. After reaction, FITC-BSA microbeads were centrifuged down and sonicated to remove the unreacted FITC-BSA.

Characterisation

Acquisition of images was carried out with an optical fluorescence microscope (Axiostar plus) with a 50 W mercury lamp and a set of filters for fluorescence measurement. A charge-coupled device (CCD) camera was used to capture fluorescence images. Data acquisition and analysis were carried out with the software "Image-Pro Express" (Media Cybernetics, Inc.) and "Array-Pro Analyzer" (Media Cybernetics, Inc.). SEM images were obtained using a Philips XL-30 FEG SEM.

Results and Discussion

Optical images of the porous film prepared according to the method above were obtained. These are shown in FIG. 2a to FIG. 2f. It was observed that ordered arrays of pores were formed over a large area of the film with only a few defects. A close examination of the film showed that the pores were very uniform and well-ordered. It was observed that under the same experimental conditions, pores were not formed if only pure polystyrene was used (results not shown). This is because after adding tetraethyl orthosilicate (TEOS) to the solution, water is more easily trapped into the solution as it is well known that water plays a part in the hydrolysis of TEOS, and the intermediate product formed after the hydrolysis is hydrophilic. Furthermore, after adding TEOS, the viscosity of the polystyrene solution was increased compared to that of pure polystyrene solution, which helped to prevent water from going out after it was trapped in the solution and also prevent water droplets from aggregation.

Figure 3:
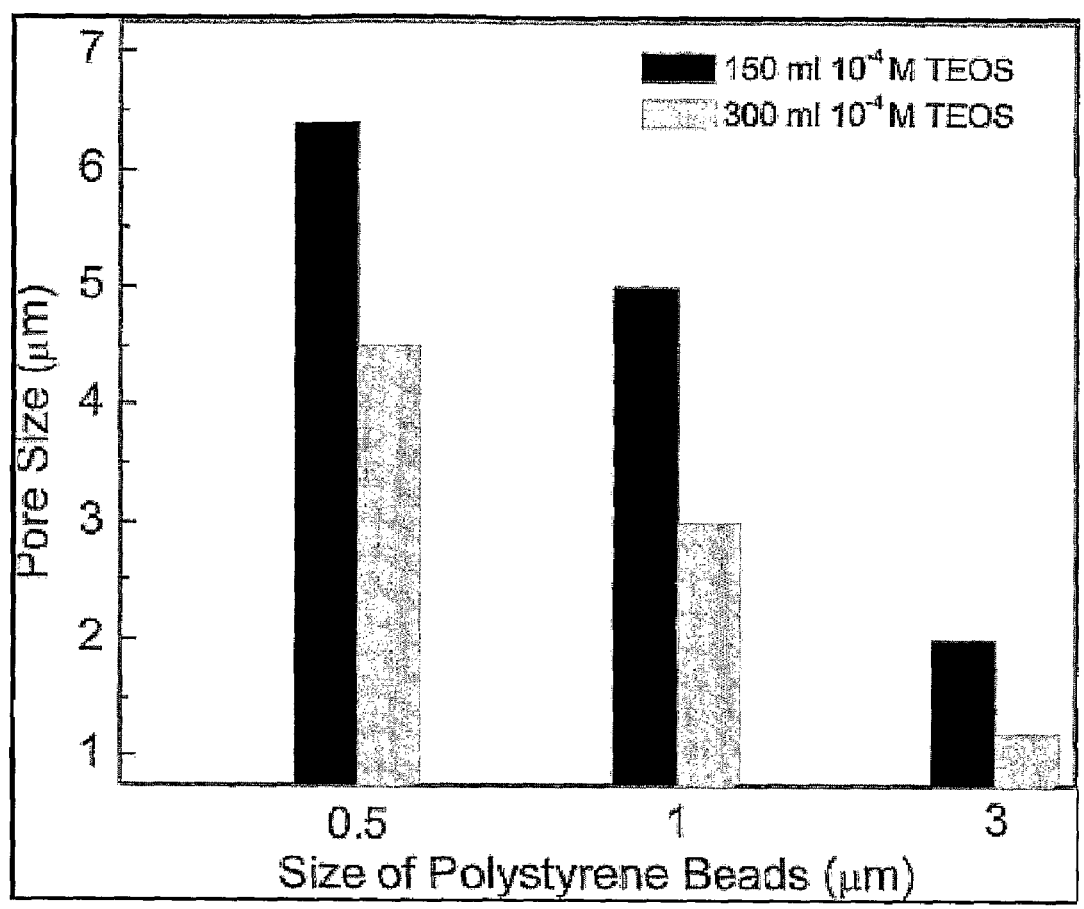
FIG. 3: Graph showing the relationship between the pore size, polystyrene bead size and amount of TEOS added.

As mentioned above, the sizes of the pores can be controlled by changing the polystyrene/silica ratio, the concentration of polystyrene/silica in toluene, and the amount of the solution added onto the surface of the substrate. The amount of TEOS added is crucial to the sizes of the pores formed. For example, when $10^{-4}$ M TEOS is added to the polystyrene solution, the pore size decreases with the amount of TEOS added. FIG. 3 shows the relationship between the pore size and the amount of TEOS added. When the same size polystyrene beads are used, more TEOS led to smaller pore size formation. If the polystyrene beads were of the same size, the total amount of polystyrene in toluene was the same, and therefore, adding more TEOS increased the TEOS/polystyrene ratio in the solution. This, in turn, increased the viscosity of the solution, making it more difficult for the trapped water droplets to grow bigger in the solution, leading to a smaller pore size (A Steyer et al, 1990). On the other hand, when the same amount of TEOS was used, the pore size decreased with the increase in the size of polystyrene beads. This is because polystyrene in bigger beads has a relatively higher molecular weight than in smaller beads, and as such the viscosity of the solution is higher to some extent which leads to a smaller pore size (J Peng et al, 2004; A Steyer et al, 1990). Therefore, to obtain larger pores, less TEOS or smaller polystyrene beads may be used.

Figure 4:
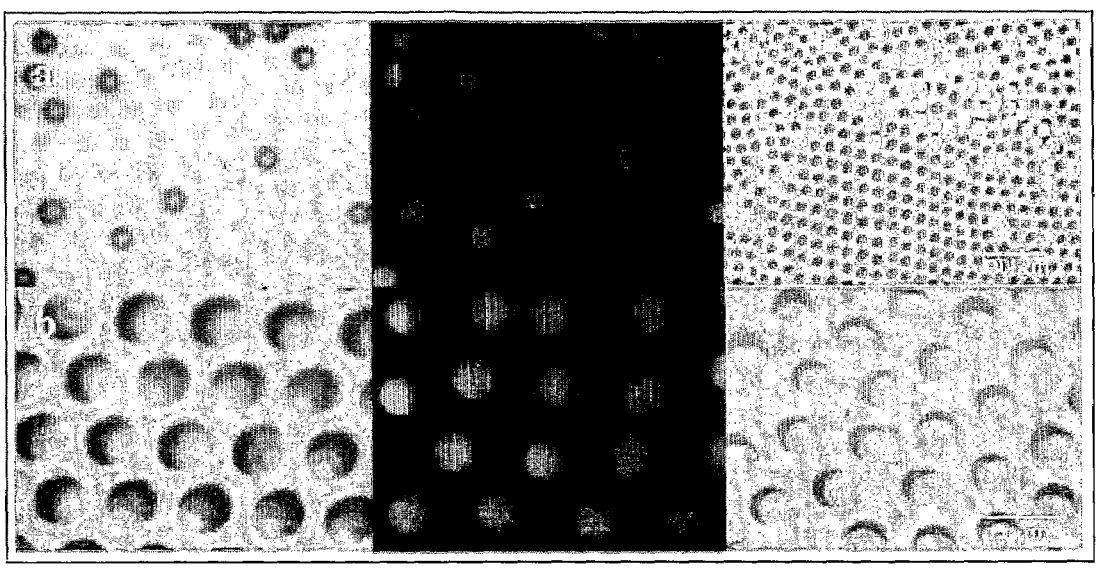
FIG. 4: (a) Optical (left), fluorescence (middle) and SEM (right) images showing the polystyrene microbeads on the pores of the porous film. (b) Optical (left), fluorescence (middle) and SEM (right) images showing the polystyrene microbeads in the pores of the porous film.

As described above, a pattern of microbeads was formed by dispensing the microbeads onto the films. The microbeads either entered the pores or sat on top of them, depending on their size. The size of the pores plays an important role in patterning the microbeads. Only microbeads with a size similar to that of the pores can be well patterned. When the size of the microbeads was bigger than that of the pores, the microbeads sat on the pores rather than entering them, as shown in FIG. 4a. In this case, it was difficult to obtain a good pattern of microbeads, because the microbeads sitting on the top of the pores are not stable and may be removed during the washing step that follows the patterning of the beads. It was seen from both the optical and SEM images in FIG. 4 that only a few microbeads remained on the film while most of the pores were empty. When the size of the microbeads was similar to, or a bit smaller than, that of the pores, the microbeads were able to enter the pores, as shown in FIG. 4b, with each microbead occupying one pore. The patterning of the microbeads on the film was visualized using a fluorescence microscope. The fluorescence (as shown in both FIGS. 4a and b) was from fluorescent polystyrene microbeads doped with rhodamine. All the pores showed a pear-like shape.

It has been demonstrated that the beads stay in the pores once they are dispensed into the pores and do not fall out of the pores during the washing process because of the special shape of the pores, as shown in FIG. 4b. However, if microbeads which are very much smaller than the pores are used, the microbeads may come out of the pores when the film is washed with water.

Figure 5:
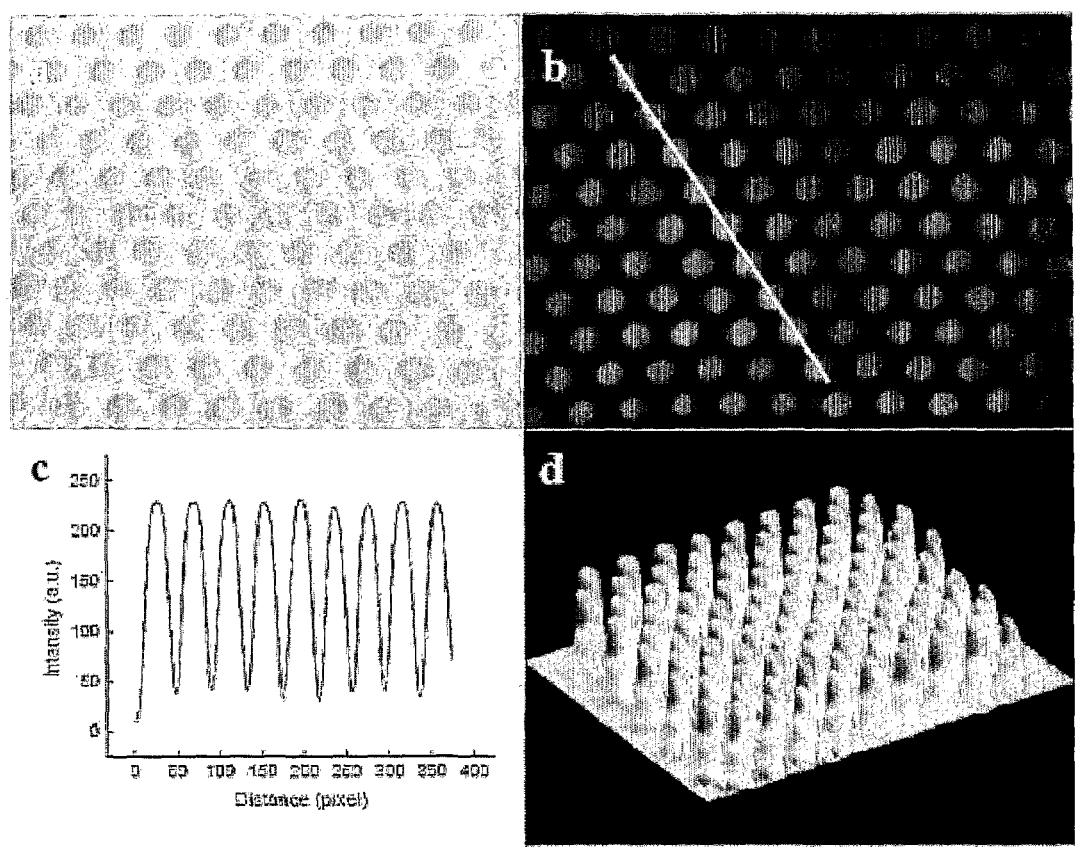
FIG. 5: (a) Optical image and (b) fluorescence image showing the patterning of fluorescent polystyrene microbeads on the porous film. (c) Line-profile graph with peaks corresponding to the microbeads indicated by the white line in (b). (d) 3D image of (b) obtained using the software Array Pro. (e) Pattern of multicoloured beads. (f) Fluorescence image of patterned polystyrene microbeads immobilized with fluorescein isothiocyanate-conjugated bovine serum albumin (FITC-BSA) on the porous film. (g) Polystyrene microbeads immobilized with anti-BSA were patterned, and the antibody was further reacted with FITC-BSA. The fluorescence image is shown.
Figure 5:
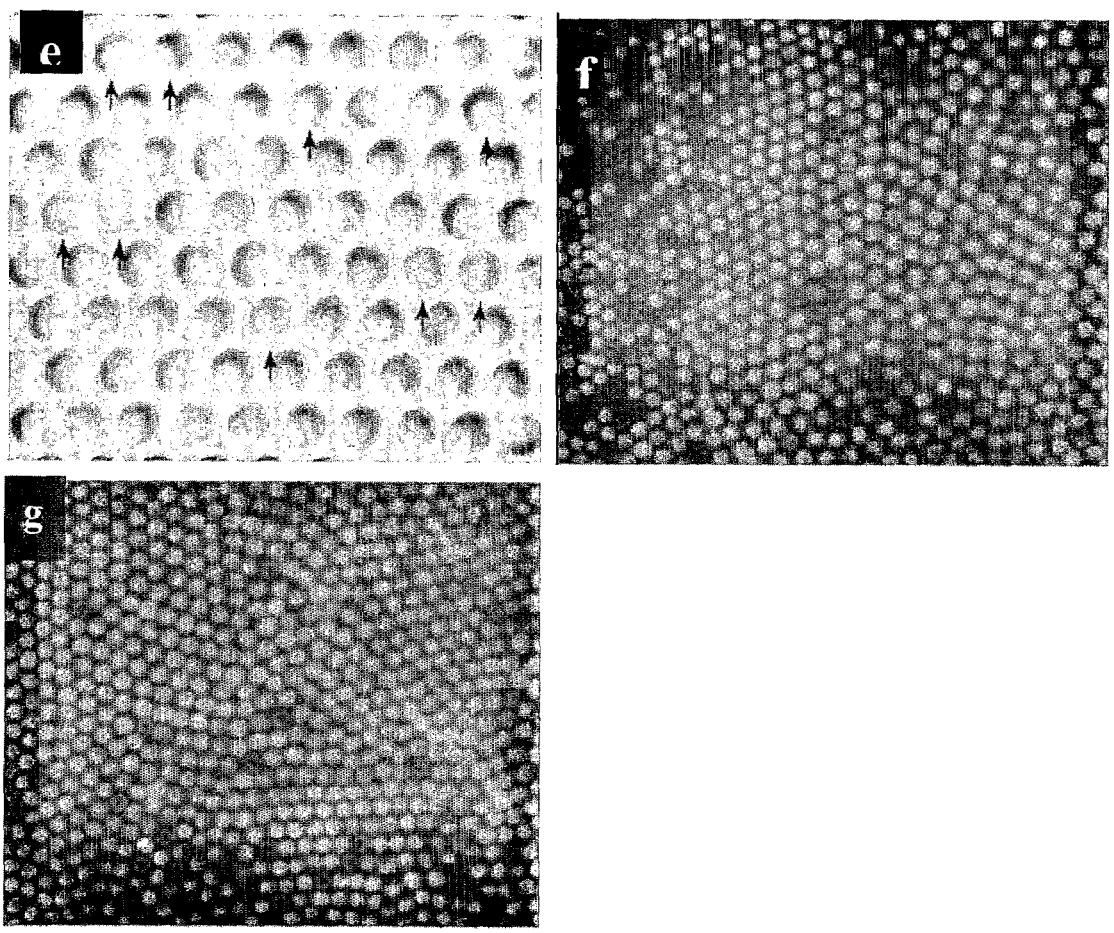

Large-area views of patterned fluorescent microbeads on the film are shown in FIGS. 5a and b. A single row of microbead spots was analyzed using the software Array Pro and the results are shown in FIG. 5c and FIG. 5d. The line-profile graph showed that the fluorescence intensities at different spots were almost the same, suggesting that the fluorescence pattern was very uniform.

Multicoloured polystyrene microbeads were also patterned, as shown in FIG. 5e. Patterning of protein-immobilized polystyrene microbeads on the film was conducted using fluorescein isothiocyanate-conjugated bovine serum albumin (FITC-BSA) as an example. As shown in FIG. 5f, most of the pores were filled with FITC-BSA polystyrene microbeads, although some pores remained empty.

In another experiment, the antibody anti-BSA was attached to polystyrene microbeads first, and the beads were then patterned on the film. The attachment of the antibody to polystyrene microbeads was similar to the immobilisation of FITC-BSA onto the microbeads as described above. A solution of FITC-BSA was then dropped onto the film, and FITC-BSA bound to the antibody on the beads. The patterning of the beads with both FITC-BSA and anti-BSA is shown in FIG. 5g.

REFERENCES

1. A. Boker, Y. Lin, K. Chiapperini, R. Horowitz, M. Thompson, V. Carreon, T. Xu, C. Abetz, H. Skaff, A. D. Dinsmore, T. Emrick, T. P. Russell, Nature Materials, 3:302, 2004
2. A. F. Jane, F. J. S., R. W. David, Analytical Chemistry, 72:5618, 2000
3. A. Last, H. Hein, J. Mohr, Microsystem Technologies-Micro-And Nanosystems-Information Storage And Processing Systems, 10:527, 2004
4. A. Steyer, P. Guenoun, D. Beysens, C. M. Knobler, Phys. Rev. B: Condens. Matter Mater. Phys., 42:1086, 1990
5. B. Francois, O. Pitois, J. Francois, Advanced Materials, 7:1041, 1995
6. B. Schweitzer, S. F. Kingsmore, Current Opinion In Biotechnology, 13:14, 2002
7. C. Cheng, R. Kimmel, P. Neiman, L. P. Zhao, Genomics, 82:122, 2003
8. C. C. Xiang, Y. D. Chen, Biotechnology Advances, 18:35, 2000
9. D. J. Resnick, W. J. Dauksher, D. Mancini, K. J. Nordquist, T. C. Bailey, S. Johnson, N. Stacey, J. G. Ekerdt, C. G.

Willson, S. V. Sreenivasan, N. Schumaker, Journal Of Vacuum Science & Technology B, 21:2624, 2003
10. D. Y. Khang, H. H. Lee, Applied Physics Letters, 75:2599, 1999
11. E. N. Warren, P. J. Elms, C. E. Parker, C. H. Borchers, Analytical Chemistry, 76:4082, 2004
12. G. M. Whitesides, E. Ostuni, S. Takayama, X. Y. Jiang, D. E. Ingber, Annu. Rev. Biomed. Eng., 3:335, 2001
13. G. Widawski, M. Rawiso, B. Francois, Nature, 369:387, 1994
14. H. Noda, Y. Kohara, K. Okano, H. Kambara, Analytical Chemistry, 75:3250, 2003
15. I. Kostic, R. Andok, V. Barak, I. Caplovic, A. Konecnikova, L. Matay, P. Hrkut, A. Ritomsky, Journal Of Materials Science-Materials In Electronics, 14:645, 2003
16. J. A. Rogers, K. E. Paul, R. J. Jackman, G. M. Whitesides, Applied Physics Letters, 70:2658, 1997
17. J. C. Jansen, D. Kashchiev, A. Erdemsenatalar, in Advanced Zeolite Science And Applications, Vol. 85, Elsevier Science PubI B V, Amsterdam, page 215, 1994
18. J. C. Mills, K. A. Roth, R. L. Cagan, J. I. Gordon, Nature Cell Biology, 3:E175,
19. J. D. Hoff, L. J. Cheng, E. Meyhofer, L. J. Guo, A. J. Hunt, Nano Letters, 4:853, 2004
20. J. D. Taylor, D. Briley, Q. Nguyen, K. Long, M. A. Iannone, L. M.-S., F. Ye, A. Afshari, E. Lai, M. Wagner, J. Chen, M. P. Weiner, Biotechniques, 30:661, 2001
21. J. Li, J. Peng, W. H. Huang, Y. Wu, J. Fu, Y. Cong, L. J. Xue, Y. C. Han, Langmuir, 21:2017, 2005
22. J. Peng, Y. C. Han, Y. M. Yang, B. Y. Li, Polymer, 45:447, 2004
23. K. J. Lee, F. Pan, G. T. Carroll, N. J. Turro, J. T. Koberstein, Langmuir, 20:1812, 2004
24. K. Kuhn, S. C. Baker, E. Chudin, M. H. Lieu, S. Oeser, H. Bennett, P. Rigault, D. Barker, T. K. McDaniel, M. S. Chee, Genome Research, 14: 2347, 2004
25. M. Campbell, D. N. Sharp, M. T. Harrison, R. G. Denning, A. J. Turberfield, Nature, 404:53, 2000
26. M. J. Heller, Annual Review Of Biomedical Engineering, 4:129, 2002
27. M. Srinivasarao, D. Collings, A. Philips, S. Patel, Science, 292:79, 2001
28. O. J. Cayre, V. N. Paunov, Journal Of Materials Chemistry, 14:3300, 2004
29. O. Karthaus, N. Maruyama, X. Cieren, M. Shimomura, H. Hasegawa, T. Hashimoto, Langmuir, 16:6071, 2000 O. Pitois, B. Francois, European Physical Journal B, 8:225, 1999
30. O. Karthaus, X. Cieren, N. Maruyama, M. Shimomura, Materials Science & Engineering C-Biomimetic And Supramolecular Systems, 10:103, 1999
31. P. E. Sheehan, R. L. Edelstein, C. R. Tamanaha, L. J. Whitman, Biosens. Bioelectron., 18:1455, 2003
32. P. Pavlickova, E. M. Schneider, H. Hug, Clinica Chimica Acta, 343:17, 2004
33. R. S. Kane, S. Takayama, E. Ostuni, D. E. Ingber, G. M. Whitesides, Biomaterials, 20:2363, 1999
34. R. Shen, J. B. Fan, D. Campbell, W. H. Chang, J. Chen, D. Doucet, J. Yeakley, M. Bibikova, E. W. Garcia, C. McBride, F. Steemers, F. Garcia, B. G. Kermani, K. Gunderson, A. Oliphant, Mutation Research-Fundamental And Molecular Mechanisms Of Mutagenesis, 573:70, 2005
35. S. Ferenc, L. M. Karri, R. W. David, Analytical Biochemistry, 291:219, 2001
36. S. V. Chittur, Combinatorial Chemistry & High Throughput Screening, 7:531, 2004
37. T. B. Martins, R. Burlingame, C. A. von Muhlen, T. D. Jaskowski, C. M. Litwin, H. R. Hill, Clinical And Diagnostic Laboratory Immunology, 11:1054, 2004
38. T. K. Jenssen, M. Langaas, W. P. Kuo, B. Smith-Sorensen, O. Myklebost, E. Hovig, Nucleic Acids Research, 30:3235, 2002
39. T. Nishikawa, J. Nishida, R. Ookura, S. I. Nishimura, S. Wada, T. Karino, M. Shimomura, Materials Science & Engineering C-Biomimetic And Supramolecular Systems, 10:141, 1999
40. V. Berger, O. GauthierLafaye, E. Costard, Journal Of Applied Physics, 82:60, 1997
41. V Devauchelle, G. Chiocchia, Revue De Medecine Interne, 25:732, 2004
42. Y. Dharmadi, R. Gonzalez, Biotechnology Progress, 20:1309, 2004

The invention claimed is:

1. A method of patterning, the method comprising the steps of:
    (a) providing a porous film comprising an ordered array of pores, the porous film being prepared according to a method comprising the steps of:
        (i) mixing at least one polymer and a silicon alkoxide to form a mixture;
        (ii) adding the mixture to at least one surface of a substrate; and
        (iii) cooling the at least one surface of the substrate to form water droplets on the surface, wherein the water droplets formed depress into the mixture on the substrate to form pores on the surface; and
    (b) adding at least one structure to the porous film.

2. The method according to claim 1, wherein the porous film is a polymeric porous film.

3. The method according to claim 1, wherein the pores of the porous film have a substantially uniform pore size.

4. The method according to claim 1, wherein the average diameter of the structure is about the same or less than the average diameter of the pores of the porous film.

5. The method according to claim 1, wherein the structure contacts the bore of at least one pore of the porous film.

6. The method according to claim 1, wherein the structure is selected from the group consisting of: beads, spheres, cells, bacteria and a combination thereof.

7. The method according to claim 1, wherein at least one capture reagent is provided on the surface of the structure.

8. The method according to claim 7, wherein the capture reagent is selected from the group consisting of: biological cells, biomolecules, ligands, drug targets and a combination thereof.

9. The method according to claim 8, wherein the biomolecules comprise proteins, DNA, antibodies and/or antigens.

10. The method according to claim 1, wherein the structure is doped or conjugated with a fluorescent material.

11. The method according to claim 1, wherein the step (i) of mixing is carried out in the presence of at least one solvent.

12. The method according to claim 1, wherein the silicon alkoxide is tetraethyl orthosilicate (TEOS).

13. A patterned porous film prepared according to the method of claim 1.

14. The method according to claim 1, wherein the structure completely or partially enters at least one pore of the porous film.

15. The method according to claim 1, wherein the polymer is polystyrene and the silicon alkoxide is TEOS.

* * * * *